June 5, 1962 S. C. RUSTAD 3,037,467
DOUGH CURLING APPARATUS
Filed Feb. 29, 1960 2 Sheets-Sheet 2
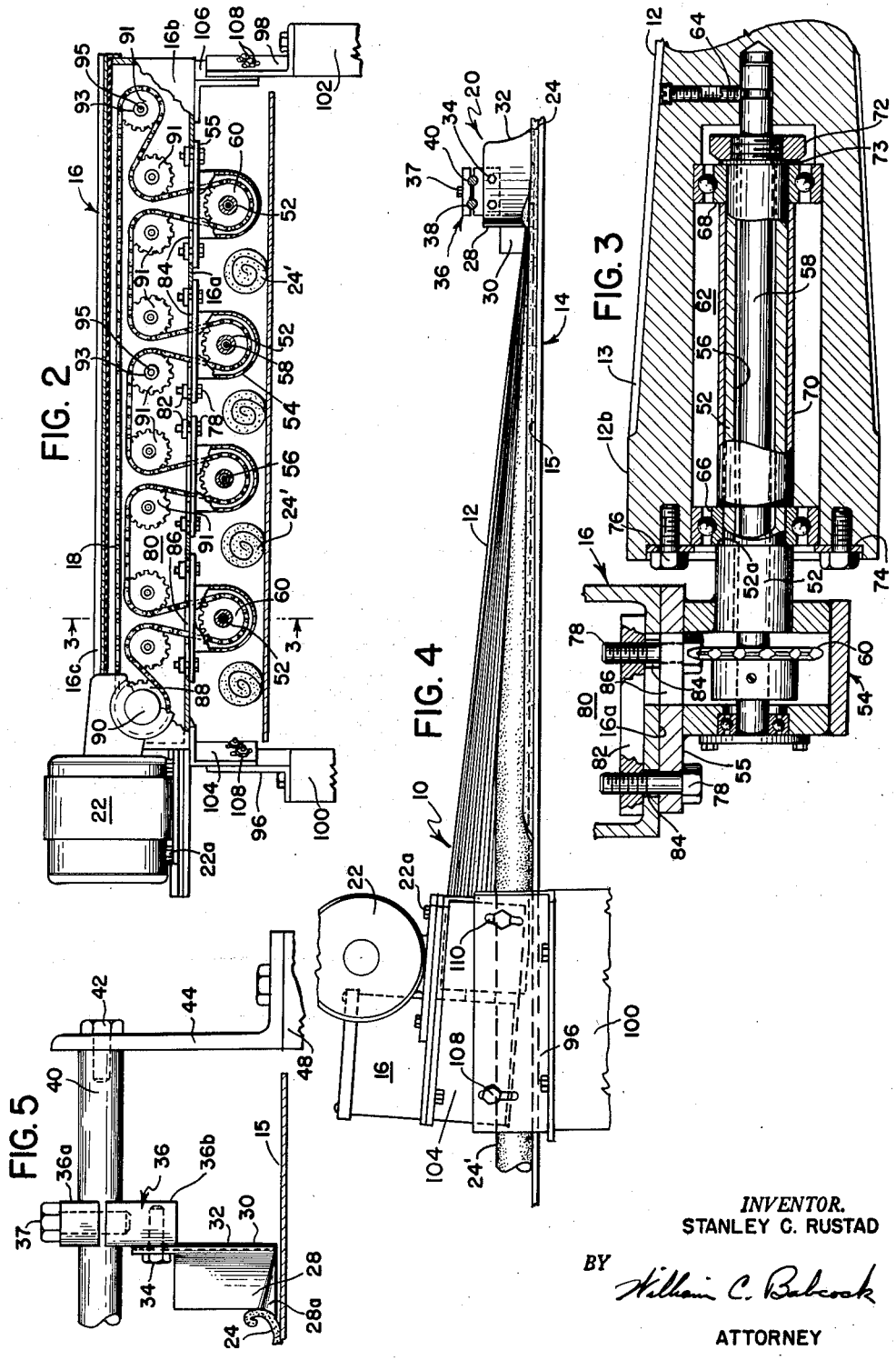
INVENTOR.
STANLEY C. RUSTAD
BY William C. Babcock
ATTORNEY

United States Patent Office 3,037,467
Patented June 5, 1962

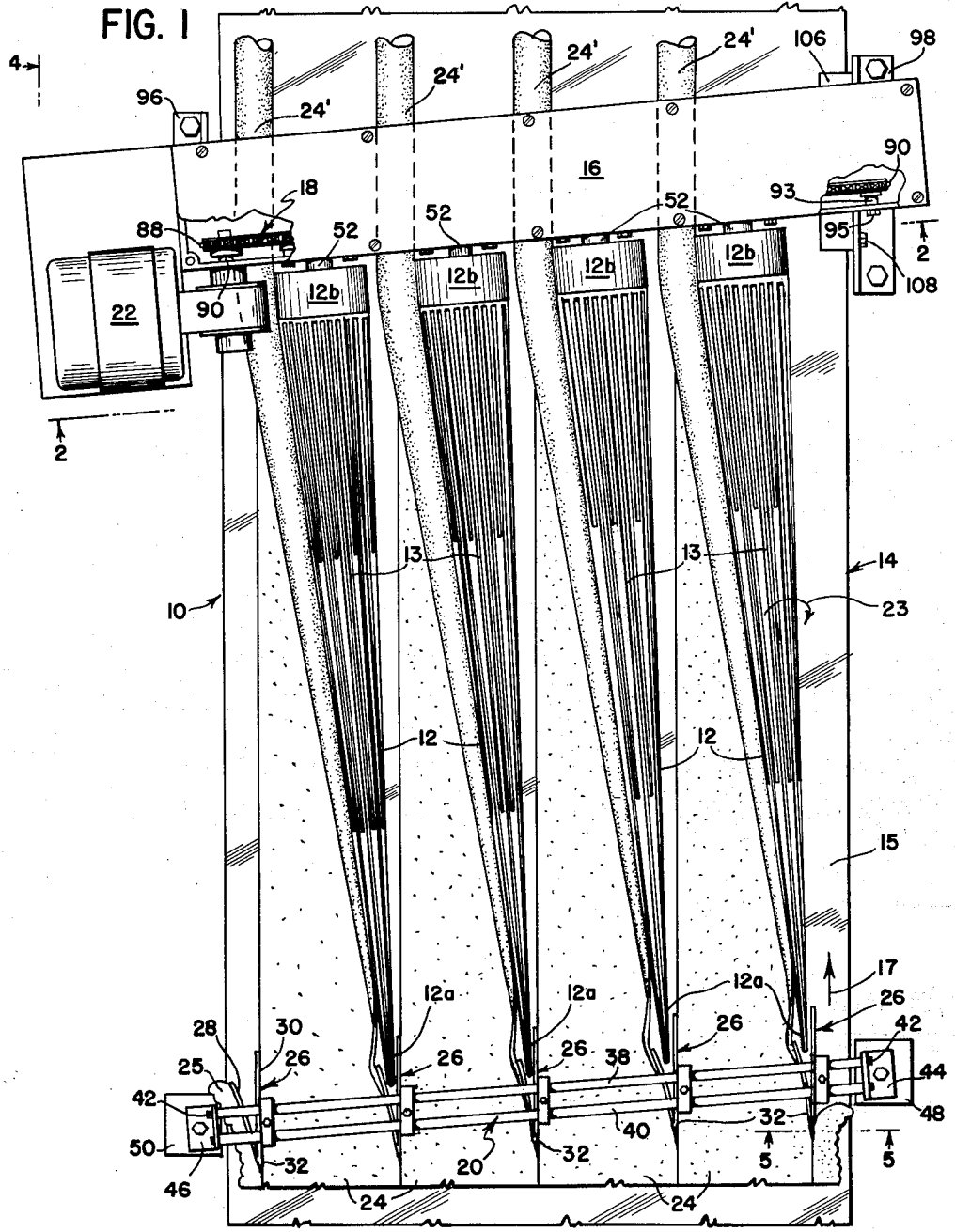

3,037,467
DOUGH CURLING APPARATUS
Stanley C. Rustad, St. Louis Park, Minn., assignor to General Mills, Inc., a corporation of Delaware
Filed Feb. 29, 1960, Ser. No. 11,879
7 Claims. (Cl. 107—9)

The present invention relates generally to a dough forming apparatus and more specifically to an improved device for curling continuous dough strips into cylindrical columns of dough.

In the baking industry devices are known for forming a sheeted dough strip into a cylindrical column of dough. Such devices generally include a cylindrical rotating arm or roller which extends diagonally across the surface of a conveyor from a drive means positioned along the side of the conveyor. The strip of dough is carried along by the conveyor and is engaged by the roller, which is rotated in a direction to curl the dough onto itself into a continuous column of dough.

Because of the angles required for such rollers to curl dough in the above manner (i.e. angles which often are as great as 30 degrees) there may be undesirable bending and distortion of the dough column. This is particularly disadvantageous when it is necessary or desirable with certain products to put marks or cuts in the dough prior to curling.

Moreover, while certain prior devices have been suggested for curling two strips of dough simultaneously, such prior constructions are not believed to be adaptable as a practical matter to the simultaneous curling of more than two laterally spaced dough strips.

Thus while such devices are applicable for certain operations, in other instances they are proved to be somewhat inadequate.

In view of the above defects in the prior art it is one object of the present invention to provide a dough curling apparatus having an improved dough curler or arm which is substantially tapered or conical in shape.

It is another object to provide such a tapered dough curler in which the narrower end of the roller first engages the dough strip.

It is a further object to provide such a dough curler in which the dough curling surface has a peripheral speed which is substantially equal to the speed at which the corresponding adjacent portion of a strip of dough is being curled at that particular point along its surface.

Yet another object of the invention is to provide a dough curling apparatus having dough curlers which are identical in shape and size and which will separate adjacent strips of dough as they are moved along a conveying means and will curl the strips into cylindrical columns of dough.

A still further object of the invention is to provide a dough curling apparatus in which a dough plow means is provided which will divide strips of dough and which will turn one longitudinal edge of each strip of dough to assure positive engagement with the dough curler.

Other objects and advantages will become apparent in the following specification and the appended drawings in which:

FIGURE 1 is a plan view of the dough curling apparatus illustrating the manner in which adjacent dough strips are curled into cylindrical columns of dough.

FIGURE 2 is a front elevational view in partial section as taken generally along line 2—2 of FIGURE 1 with portions of the bridge broken away to illustrate the drive means for rotating the dough curlers.

FIGURE 3 is a sectional view taken generally along, and in the direction of lines 3—3 of FIGURE 2 to illustrate the manner in which each of the dough curlers is supported from the supporting bridge.

FIGURE 4 is a side elevational view of the dough curling apparatus as taken generally along line 4—4 of FIGURE 1 and;

FIGURE 5 is a partial front elevational view taken generally along line 5—5 of FIGURE 1 to illustrate one of the dough plows of the invention.

The dough curling apparatus in which this invention is embodied is indicated generally by the numeral 10 and includes one or more improved conical or tapered dough curlers 12 which are positioned in close proximity to a conveyor 14. A supporting bridge 16 is positioned above the curlers and the conveyor, and the enclosed chain drive 18 within the bridge 16 is associated with a motor 22 for rotating the curlers 12. In certain cases, especially where plural strips of dough are to be curled, it may also be desirable, according to the invention, to provide a dough plow assembly 20 associated with the dough curling apparatus. Such a plow assembly assists in separating adjacent strips of dough and assures continuous positive engagement of the dough with the curlers.

The conveyor 14 in the present instance is a belt type dough conveyor and since such conveyors are well known in the art a detailed description of its construction will not be presented. The conveyor belt 15 moves along a path substantially longitudinally of the dough curlers 12 as indicated by the arrow 17 and carries thereon a plurality of similar dough strips 24 which have been previously severed in known manner from a sheeted strip of dough. Dough strips such as those indicated by the numeral 24 are severed from a sheet of dough in side by side relationship and as seen in the drawings proceed along the conveyor belt 15 with their sides touching the adjacent strips of dough.

The dough plow assembly 20 is positioned immediately ahead of the dough curlers 12 in the path of the oncoming strips of dough and includes a member which separates the strips 24 just prior to their engagement with the dough curlers.

The dough plow assembly 20 includes a plurality of such members which are shown as plowshares 26, positioned above the conveyor belt 15 between each of the adjacent strips of dough. Similar plowshares 26 are also positioned at the sides of the dough strips for removing any excess or ragged edges 25.

Each plowshare member 26 is substantially identical in construction and has vertical plow boards 28 and 30 which terminate in a forwardly extending plow point 32. These plows are attached by screws 34 to supporting clevis blocks 36. The clevis blocks 36 each have an upper and a lower half 36a and 36b which are clamped by a screw 37 to the opposite sides of support rods 38 and 40. The support rods 38 and 40 extend across the width of the conveyor 14 and are attached by screws or bolts 42 to supporting brackets 44 and 46 mounted on frame members 48 and 50 along the sides of the conveyor. Accordingly, each plowshare 26 can be laterally shifted along the rods 38 and 40 by loosening the screws 37, to compensate for various widths of dough strips to be curled in the same manner. Each plowshare of course is easily attached or removed when it is desirable to increase or decrease the number of dough curlers.

As can be seen in FIGURE 1 each plowshare 26 is positioned such that its plow boards 28 and 30 extend along opposite sides of the forward end or apex 12a of the improved dough curlers. The plow board 30 of each plowshare extends substantially parallel to the longitudinal edge of the dough strip adjacent thereto while plow boards 28 extend angularly away from the plow point 32 along their trailing edge on the opposite side of their respective dough curler.

Each plow board 28 is provided along its lower trailing edge adjacent the conveyor with an outwardly curling edge or surface 28a which tapers forwardly and inwardly toward the lower edge of the plowshare point 32. As the dough strips 24 move along the conveyor 14 they are separated by their respective plowshares and one of their longitudinal edges is picked-up and slightly curled as it engages the previously mentioned curved surface 28a. Thus the dough strips are separated, and continuous positive curling engagement is assured between the dough strip 24 and its respective curler 12.

The dough curlers 12 of the instant invention provide considerable improvement over curlers known presently in the art. For example, three or more adjacent strips of dough can be curled simultaneously. An additional feature of the present apparatus is that the dough curlers 12 can be mounted in substantially the same width or area of the conveyor 15 as is required to carry the desired number of dough strips along the conveyor.

Each dough curler 12 is substantially conical in shape and may be provided along its dough engaging surface with a series of grooves or serrations 13, some of which extend along the entire length of the curler to provide additional traction when the curler is in curling engagement with a strip of dough. In some instances, however, it may be desirable to omit the serrations entirely or to provide other types of frictional surfaces which may or may not extend over the total surface of the curler.

Since the dough curlers 12 are substantially identical to each other in construction, each curler and its associated parts will be given like numeral designations. For example, each dough curler 12 is rotatably supported at its heel or butt end 12b on a support shaft 52 which is integral with an enclosed drive chamber 54 attached to the overhead bridge 16.

As seen in FIGURES 2 and 3 each support shaft 52 is provided with an axial bore 56 through which extends a drive shaft 58 provided with a chain drive sprocket 60 within the chamber 54. The drive shaft 58 extends into an annular chamber 62 in the butt or heel end of the dough curler 12 and a set screw 64 secures that end of the shaft to the curler 12.

The support shaft 52 also extends into the annular chamber 62 and is surrounded within the annular chamber 64 by bearings 66 and 68 which rotatably support the curler 12 on the support shaft 52. The bearings 66 and 68 are spaced apart on the support shaft 58 and are held in their spaced relationship by a spacer 70 which surrounds the support shaft 52. A lock nut and washer 72 and 73 serve to retain the bearings in position by causing bearing 66 to be held against an annular shoulder 52a on the support shaft 52. A retaining plate 74 surrounds the support shaft 52 and is secured by bolts 76 to the heel end 12b of the curler 12 to retain the bearings 66 and 68 and the support shaft 52 within the chamber 62.

Thus in the above manner each dough curler 12 is rotatably supported by its support shaft on the enclosed drive chamber 54 which is in turn attached to the supporting bridge 16. Each of the drive chambers 54 is attached to the bridge 16 in similar manner by screws or bolts 78 which extend into the interior 80 of the bridge and are threaded at their upper ends into support plates 82. The support plates 82 extend transversely across lateral slots 84 in the lower surface 16a of the bridge 16 and by loosening the screws 78 the drive chambers 54 can be shifted laterally along the width of the conveyor to compensate for various widths of dough strips that are to be curled.

Also provided in the upper ends of the chambers 54 are vertical slots 86 which extend through the top plate 55 of the chamber 54 and the lower surface 16a of the bridge. The latter named slots provide an opening for the entrance and return of the continuous chain drive 18 which extends around each of the chain sprockets 60. The chain sprockets 60 serve to rotate each of the curlers 12 in the direction of arrow 23 to simultaneously curl their respective strips of dough.

The chain drive 18 as seen more specifically in FIGURE 2 is driven by a drive sprocket 88 on the drive shaft 90 of the motor 22 and extends around a series of idler sprockets 91 rotatably journaled on shafts 93 secured to by screws 95 to the front wall 16b of the bridge 16. The chain drive 18 also extends around sprockets 60 and rotates each of the curlers 12 in a like direction when they are curling strips of dough. The motor 22 is secured to the bridge 16 by bolts 22a with its drive sprocket interior of the bridge 16 and a removable cover 16c on the bridge 16 provides access to the chain drive 18 and the idler sprockets 91.

At this point attention is directed to the manner of positioning the enclosed bridge 16 and dough curlers 12 in close proximity with the top surface of the conveyor belt 15. The narrow end of each curler is located "upstream," i.e. nearer the end of the conveyor from which the dough approaches the curler.

Since the dough curlers 12 are substantially conical in shape their axes extend angularly away from the top surface of the conveyor 14 along the direction of movement of the dough.

It is necessary to provide a suitable mounting means for the bridge 16 which will allow the dough curlers 12 to be positioned as described above. This is accomplished by side angle plates 96 and 98 which are secured to upright frame members 100 and 102 on opposite sides of the conveyor 14. Brackets 104 and 106 are welded or otherwise secured to lower surface 16a of the bridge and extend downwardly in sliding engagement with the angle plates 96 and 98. Suitable bolts 108 extend through angularly disposed slots 110 in the plates 96 and 98 and by loosening the said bolts the entire bridge 16 and the parts mounted thereon can be tilted forward at an angle relative to the conveyor.

Referring once more to the dough curlers 12 as viewed in FIGURE 1, as noted these dough curlers 12 are disposed above the conveyor at a slight angle to its central longitudinal axis with their small tip or apex 12a extending upstream near or at one edge of each strip of dough. The dough curlers extend diagonally across the strips of dough 24 with one side of their heel end 12b substantially near the other edge of each strip of dough. As the dough strips 24 move past the dough plow assembly 20 they are engaged substantially at or near the forward or apex ends 12a of the curlers and are gradually rolled by the curlers into cylindrical columns of dough 24' by the time they have reached the heel or butt ends 12b of the curlers.

This arrangement provides a dough curler section of small diameter at the region where the dough strip first begins to curl, and dough curler sections of larger diameter where the dough strip has been curled to greater diameter. Thus the peripheral speed of the dough curler surface can be more closely coordinated with the peripheral speed of the curling dough as the diameter of the dough roll increases. Moreover, this arrangement of generally similar cross sectional diameters for the curler and the dough roll at each step along the conveyor is believed to provide an improved lifting, rolling or curling contact between the curler and dough all along the strip, to provide a tighter roll of dough with minimum distortion.

While a number of factors are considered when constructing and positioning the curlers on the dough conveyor 14 it can be generally stated that the peripheral speed at any point on the curler is preferably substantially proportional to the speed at which the dough strip is being curled at that particular point. For example, with a conical curler which is 4 inches in diameter at the heel or butt end 40 r.p.m. is practical when the conveyor belt speed is around 30 feet per minute.

While the above description is representative of the invention it will be realized that numerous modifications in its construction are possible. For example, numerous variations are possible both in the length and the diameter of the curler, in the shape of its apex or point and in the method by which rotation is supplied thereto.

Thus in the above specification a disclosure of the principles of the invention is presented together with some of the embodiments by which the invention can be carried out.

Now, therefore, I claim:

1. A dough curling apparatus comprising a conveyor means for moving said strip of dough along a prescribed path, a conical dough curling means above said conveyor means intermediate the sides thereof, said dough curling means positioned in close proximity with said conveyor means and having its apex extending diagonally converse to the direction of movement of said conveyor, a dough plow adjacent the apex of said dough curler, said dough plow engaging one longitudinal edge of said dough and lifting said edge away from said conveyor into engagement with said curler, and drive means associated with said curling means for rotating said curling means to curl said strip into a continuous cylindrical column of dough.

2. A dough curling apparatus comprising a conveyor means for moving strips of dough along a prescribed path, a dough curling means above said conveyor means intermediate the sides thereof, said dough curling means including a plurality of conical dough curlers laterally spaced apart on said conveyor and in close proximity therewith, each of said dough curlers having its apex extending diagonally converse to the direction of movement of said conveyor, a dough plow adjacent the apex of each of said dough curlers, each of said dough plows engaging one longitudinal edge of its respective dough strip and lifting said edge away from said conveyor into engagement with its respective dough curlers, and drive means associated with said curling means for rotating said dough curlers to curl said strip into a continuous cylindrical column of dough.

3. A dough curling apparatus comprising a conveyor means for moving a strip of dough along a prescribed path, an enclosed supporting bridge superjacent said conveyor means, and an enclosed drive chamber on said supporting bridge above said conveyor means, a communicating passageway between said bridge and said drive chamber, a dough curler support shaft integral with said chamber and provided with an axial bore, a bearing means surrounding said support shaft, a conical dough curling means positioned above said conveyor means intermediate the sides thereof, said dough curling means having its apex extending diagonally converse to the direction of movement of the conveyor, and adapted to diagonally engage said strip of dough, said dough curling means having its end opposite said apex surrounding said support shaft and rotatably supported on a bearing means, a drive shaft extending axially through said bore and attached at one end to said dough curler, said drive shaft provided with a chain sprocket interior of said chamber and journaled in a bearing means within said chamber, a motor means provided with a drive sprocket on said bridge and a chain drive between said sprockets for causing rotation of said dough curling means to curl said strip in a cylindrical column of dough.

4. A dough curling apparatus comprising a conveyor means for moving strips of dough continuously along a prescribed path, a supporting bridge superjacent said conveyor means, a plurality of enclosed drive chambers on said supporting bridge above said conveyor means, a communicating passageway between said bridge and each of said drive chambers, a dough curler support shaft integral with each of said chambers and support shaft having an axial bore therein, a bearing means surrounding each of said support shafts, a plurality of conical dough curlers above said conveyor means with the apex of each of said dough curlers extending diagonally converse to the direction of movement of the conveyor and each adapted to diagonally engage at least one of said strips of dough, each of said dough curlers having its end opposite said apex surrounding one of said support shafts, each of said curlers rotatably supported on one of said bearing means on its respective support shaft, a drive shaft extending axially through each of said bores, and each shaft attached at its one end to its respective dough curler, each of said drive shafts journaled in a bearing means within its respective chamber and each provided with a chain sprocket interior of said chamber, a motor means provided with a drive sprocket on said bridge, and a chain drive between said sprockets for simultaneously rotating each of said dough curlers to curl their respective dough strips into cylindrical columns of dough.

5. A dough curling apparatus comprising a conveyor means for moving strips of dough along a prescribed path, a dough curling means above said conveyor means intermediate the sides thereof, said dough curling means including a plurality of conical dough curlers laterally spaced apart on said conveyor and in close proximity therewith, each of said dough curlers having its apex extending diagonally converse to the direction of movement of said conveyor, a dough plow means above said conveyor means adjacent the apex end of said curling means, said dough plow means having a plurality of plowshares, one between each of said strips of dough, each said plowshare having a first and a second plow board disposed on the opposite sides of the apex of one of said dough curlers, said plowshares terminating in a plow board forward of said apex between the adjacent strips of dough, said first plow board extending generally along one side of said dough curler parallel to the adjacent strip of dough, said second plow board verging outwardly along the opposite side of said dough curler, said second plow board provided with a curved lower surface adjacent the conveyor, said curved surface engaging one longitudinal edge of the adjacent strip of dough and lifting said edge into engagement with said dough curling means, and means operable with said dough curling means to curl said strip into a continuous cylindrical column of dough.

6. In a dough curling apparatus having a conveyor means for moving a strip of dough longitudinally in one direction along a prescribed path, the improvement comprising a tapered dough curling member above said conveying means and in close proximity therewith, said dough curling member being located wholly between the vertical projections of the sides of said strip of dough with its apex end extending conversely to the direction of movement of said dough, said apex being located at one side of the strip, and said dough curling member having an axis of rotation diagonal to said strip of dough, and drive means operatively connected to said dough curling member for rotating said dough curling member in a direction curling said dough strip into a continuous longitudinal column of dough.

7. A dough curling apparatus comprising a conveyor means for moving a plurality of dough strips longitudinally in side by side relation along a prescribed path, a dough curling means above said conveyor means, said dough curling means including a plurality of conical dough curlers each having a curling surface lying substantially parallel to and in close proximity to said conveyor means, each of said dough curlers having its apex end extending diagonally converse to the direction of movement of said dough strips, each of said curlers extending into the path of a different strip of dough with its apex located at the edge of its corresponding dough strip, all of said dough curlers being located within an area having substantially the same width as the width of said conveyor means required to carry said strips, and drive means operatively associated with said curlers for rotating each of said curlers to curl said strips into continuous longitudinal cylindrical columns of dough.

References Cited in the file of this patent

UNITED STATES PATENTS

| | | |
|---|---|---|
| 698,814 | Chase et al. | Apr. 29, 1902 |
| 2,352,617 | Cohen et al. | July 4, 1944 |
| 2,674,209 | Anetsberger et al. | Apr. 6, 1954 |

FOREIGN PATENTS

| | | |
|---|---|---|
| 8,664 | Great Britain | June 11, 1915 |